United States Patent [19]
Wyatt

[11] Patent Number: 6,041,411
[45] Date of Patent: Mar. 21, 2000

[54] METHOD FOR DEFINING AND VERIFYING USER ACCESS RIGHTS TO A COMPUTER INFORMATION

[76] Inventor: Stuart Alan Wyatt, 24806 SE. Mirrormont Way, Issaquah, Wash. 98027

[21] Appl. No.: 08/827,548

[22] Filed: Mar. 28, 1997

[51] Int. Cl.[7] .............................. G06F 13/00; H04L 9/32; H04L 9/12; H04K 1/00
[52] U.S. Cl. ............................ 713/200; 713/201; 380/4; 380/25; 380/27
[58] Field of Search .............................. 395/186, 188.01, 395/187.01; 380/3, 4, 23, 25, 27; 705/26, 27; 713/200, 201

[56] References Cited

U.S. PATENT DOCUMENTS

| | | | |
|---|---|---|---|
| Re. 32,985 | 7/1989 | Nagata et al. | 364/401 |
| 4,259,720 | 3/1981 | Campbell | 364/200 |
| 4,270,042 | 5/1981 | Case | 235/379 |
| 4,302,810 | 11/1981 | Bouricius et al. | 364/200 |
| 4,528,643 | 7/1985 | Freeny, Jr. | 364/900 |
| 4,688,169 | 8/1987 | Joshi | 364/200 |
| 4,797,920 | 1/1989 | Stein | 380/24 |
| 4,823,264 | 4/1989 | Deming | 369/401 |
| 4,912,762 | 3/1990 | Lee et al. | 380/24 |
| 4,933,971 | 6/1990 | Bestock et al. | 380/44 |
| 5,022,076 | 6/1991 | Rosenow et al. | 380/2 |
| 5,121,345 | 6/1992 | Lentz | 395/186 |
| 5,138,712 | 8/1992 | Corbin | 395/700 |
| 5,222,134 | 6/1993 | Waite et al. | 380/4 |
| 5,283,829 | 2/1994 | Anderson | 380/24 |
| 5,349,643 | 9/1994 | Cox et al. | 380/25 |
| 5,371,797 | 12/1994 | Bocinsky, Jr. | 380/24 |
| 5,388,211 | 2/1995 | Hornbuckle | 395/186 |
| 5,416,840 | 5/1995 | Cane et al. | 380/4 |
| 5,457,798 | 10/1995 | Alfredsson | 395/700 |
| 5,465,206 | 11/1995 | Hilt et al. | 364/406 |
| 5,548,645 | 8/1996 | Ananda | 380/4 |
| 5,557,518 | 9/1996 | Rosen | 364/408 |
| 5,734,819 | 3/1998 | Lewis | 395/186 |
| 5,737,416 | 4/1998 | Cooper et al. | 395/186 |
| 5,758,068 | 5/1998 | Brandt et al. | 395/186 |

OTHER PUBLICATIONS

"Secure Electronic Commerce Method and Apparatus", Serial No. 08/735,308, filed Oct. 22, 1996.

*Primary Examiner*—Norman Michael Wright

[57] ABSTRACT

A method for minimizing the potential for unauthorized use of digital information, particularly software programs, digital content and other computer information, by verifying user access rights to electronically transmitted digital information. A second computer system transmits requested digital information to a requesting first computing system in wrapped form, which includes digital instructions that must be successfully executed, or unwrapped, before access to the digital information is allowed. Successful unwrapping requires that certain conditions must be verified in accordance with the digital instructions, thereby allowing access to the digital information. In one embodiment, verification includes locking the digital information to the requesting computer system by comparing a generated digital fingerprint associated with the digital information to a digital fingerprint previously generated which is unique to the requesting computer system.

6 Claims, 11 Drawing Sheets

METHOD FOR DEFINING AND VERIFYING USER ACCESS RIGHTS TO A COMPUTER INFORMATION

FIELD OF THE INVENTION

This invention relates generally to facilitating electronic commerce, and more particularly to a method for minimizing the potential for unauthorized use of digital information, particularly software programs, digital content and other computer information.

BACKGROUND OF THE INVENTION

Electronic commerce, or e-commerce as it is commonly called, includes the transfer of orders or other sales communications, credit information, electronic "funds", and digital products. Electronic commerce has been recognized as offering the promise of providing speed and convenience to many types of commercial activities. Interest in electronic commerce has heightened with the advent of widely accessible communication systems such as the Internet. Other means for providing electronic commerce include direct telephone line connections, interactive cable or television services, telefacsimile services, local and wide area network communications and the like. Electronic data communications technologies, particularly the Internet, have greatly enhanced marketing and retail opportunities and activities.

To a large extent, the promise of electronic commerce has not been fully realized, partially because of concerns with security such as the potential for unauthorized manipulation of information. Such unauthorized manipulation of information includes diverting electronic fund transfers and delivery of unauthorized software (also referred to as "bootleg" or "pirated" software) to unauthorized destinations.

Although some attempts have been made to enhance the security of electronic commerce, software "pirating" has continued to affect software publishers, particularly due to the relative ease in electronically downloading or transmitting illegal copies of digital information. While the Internet provides a convenient medium for providing legally obtained electronic information, it similarly provides a convenient way to copy software. Even where software has been encrypted, once it is decrypted, the program or other digital content can be copied to other systems.

There is a need, therefore, for a method for facilitating electronic commerce which preferably minimizes the potential for unauthorized use of software programs, digital content and other computer information. The present invention provides a solution to these and other problems, and offers other advantages over the prior art.

SUMMARY OF THE INVENTION

The present invention addresses the problems of the prior art by providing a method for verifying user access rights to electronically transmitted digital information. The present invention includes a "locking" aspect which securely associates particular computer files or programs to a particular computer. The present invention further includes a "wrapping" aspect which prohibits execution of a computer file or program on any computer where it is determined that the computer file or program was not validly purchased.

In accordance with one aspect of the invention, a computer-implemented method for securing transmitted digital information to a first computer system is provided. The digital information is provided by a second computing system, which may include multiple computers. The first computing system, or requesting system, makes a request to the second computing system, or provider system, to transmit requested digital information. This digital information may include executable files, data files, and other multimedia content such as graphics and audio files. The provider system transmits the requested digital information to the first computing system in wrapped form. Information is wrapped by including digital instructions with the requested digital information. The digital information must be successfully unwrapped before access to the digital information is allowed. Successful unwrapping involves execution of the digital instructions such that certain conditions are verified in accordance with the digital instructions, thereby allowing access to the digital information.

In accordance with another aspect of the invention, a computer-implemented method to securely associate, or lock, a computer file with a target computing system is provided. The method provides for the prevention of access to the computer file by computer systems other than the target computing system. A first digital identifier is generated, which is unique to the target computing system, by using particular attributes of the target computing system in an algorithm which creates the first digital identifier. The first digital identifier is stored as an associated part of the computer file which is being locked to the target computing system. A second digital identifier is generated upon an attempt to access the computer file, using the same algorithm which created the first digital identifier, but using the attributes of the computing system attempting to access the computer file. The first and second digital identifiers are then compared, and where the first and second digital identifiers are the same, the computer attempting to access the computer file is recognized as the target computing system, and is allowed to access the computer file.

In accordance with yet another aspect of the invention, a computer-implemented method for permitting access to one or more data packages is provided. A product activation code is associated with designated data packages that are stored in a storage system. The product activation code indicates whether there is authorization to access the one or more data packages from the particular storage system. Electronic instructions are also associated with the data packages. The electronic instructions are executed upon an attempt to access any of the designated data packages. These instructions monitor for the presence of the product activation code, and allow access to data packages only where the product activation code indicates that access is authorized.

Still other objects and advantages of the present invention will become readily apparent to those skilled in this art from the following detailed description. As will be realized, the invention is capable of other and different embodiments, and its details are capable of modification without departing from the scope and spirit of the invention. Accordingly, the drawing and description are to be regarded as illustrative in nature, and not as restrictive.

DETAILED DESCRIPTION OF THE ILLUSTRATED EMBODIMENTS

Figure 1:
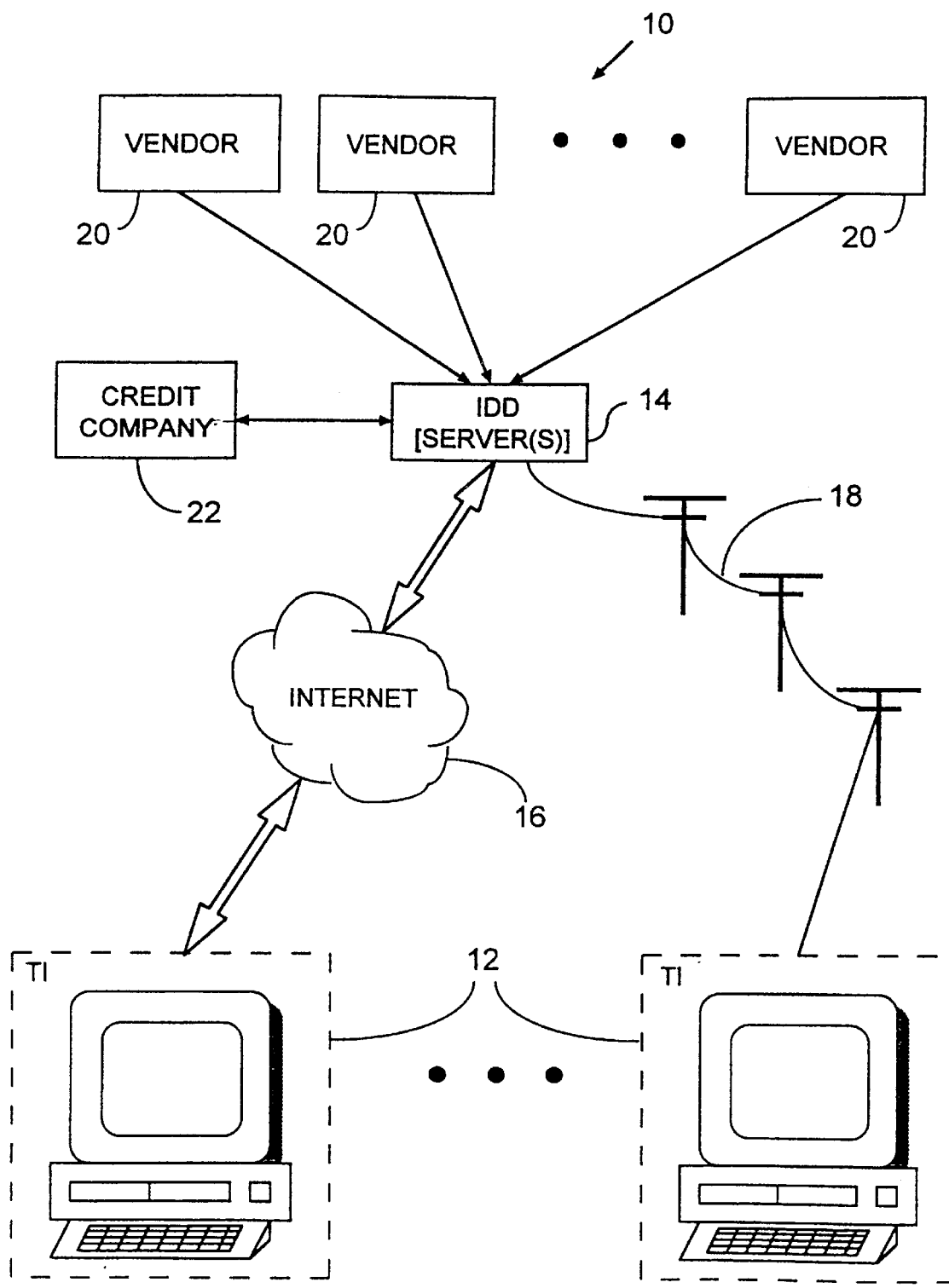
FIG. 1 is a block diagram illustrating one embodiment of a computing system formed in accordance with the present invention.

FIG. 1 is a block diagram illustrating one embodiment of a computing system 10 formed in accordance with the present invention. In the embodiment depicted in FIG. 1, a plurality of transaction initiators (TI) 12 can be connected in a variety of ways to the intermediary data destination (IDD) 14. The IDD in FIG. 1 includes one or more server computing systems, which share their resources, including hard disk drives, attached peripherals such printers and CD-ROM drives, and communications circuits.

The transaction initiators (TI) 12 illustrated in FIG. 1 are represented by client computing systems. Client software within a client computer allows the client computer to communicate with the IDD 14. In the example of FIG. 1, the client computers 12 are coupled to the server 14 in one or more ways, including an Internet connection 16 or a telephone wire connection 18 using modulator/demodulators (modem) within the client computers 12 and the server 14. Other types of electronic communication devices can also be used rather than the client computer 12 in connection with the present invention. For example, the TI 12 may provide for electronic communications using devices other than a client computer, such as a personal communication device (PCD), cellular or other telephone, interactive television, and the like. Furthermore, connections from the TI 12 to the IDD 14 can also be accomplished in various manners, including communication over cellular telephone systems or other wireless links such as microwave or infrared communication links, Ethernet®, token ring or other local area or wide area network communications systems, Internet communications, satellite communications, fiber optic communications, and the like.

The intermediary data destination (IDD) 14 is referred to as an intermediary device because it is situated between the TIs 12 and one or more product vendors 20. In the system of FIG. 1, it is not necessary for a TI 12 to directly communicate with any of the vendors 20. Instead, the TI 12 can communicate with the IDD 14, which in turn communicates with the vendors 20. Therefore, even where the TI 12 initiates a purchase of goods or services from a variety of the vendors 20, the TI 12 needs only communicate with the IDD 14, thereby decreasing the total number of communication links.

Often sensitive information, such as credit card numbers or other personal information, is transmitted between a TI 12 and the IDD 14 via the Internet channel 16 or the telephone link 18. The arrangement of FIG. 1 increases the user's confidence that the credit card information or other sensitive information will remain secure, as the user needs to have confidence only in a single entity, the IDD 14. It is the IDD 14 rather than the vendors 20 which verifies credit status with a credit company 22, so that the user needs to have confidence only in the security of the relationship and communication links between the IDD 14 and the credit company 22 rather than a plurality of relationships and communication links between various vendors and their respective banking or credit companies.

The system of FIG. 1 provides for the transmission of digital information to the TI 12. In one embodiment, the vendors 20 are software vendors, providing digital information which can be downloaded to the purchasing TIs 12 via the IDD 14. The client computer of the TI 12 allows a user to enter a purchase request, which is transmitted to the IDD, or server, 14. The server 14 validates the purchase request, and transmits a return message containing the purchased software to the client computer 12. The purchased software is previously provided to the server 14 from the appropriate vendor 20. The client computer 12 receives the purchased software, and stores it on the hard disk of the client computer 12 for subsequent use. However, as will be appreciated by those skilled in the art, the present invention is not limited to the client/server relationship depicted in FIG. 1.

Figure 2:
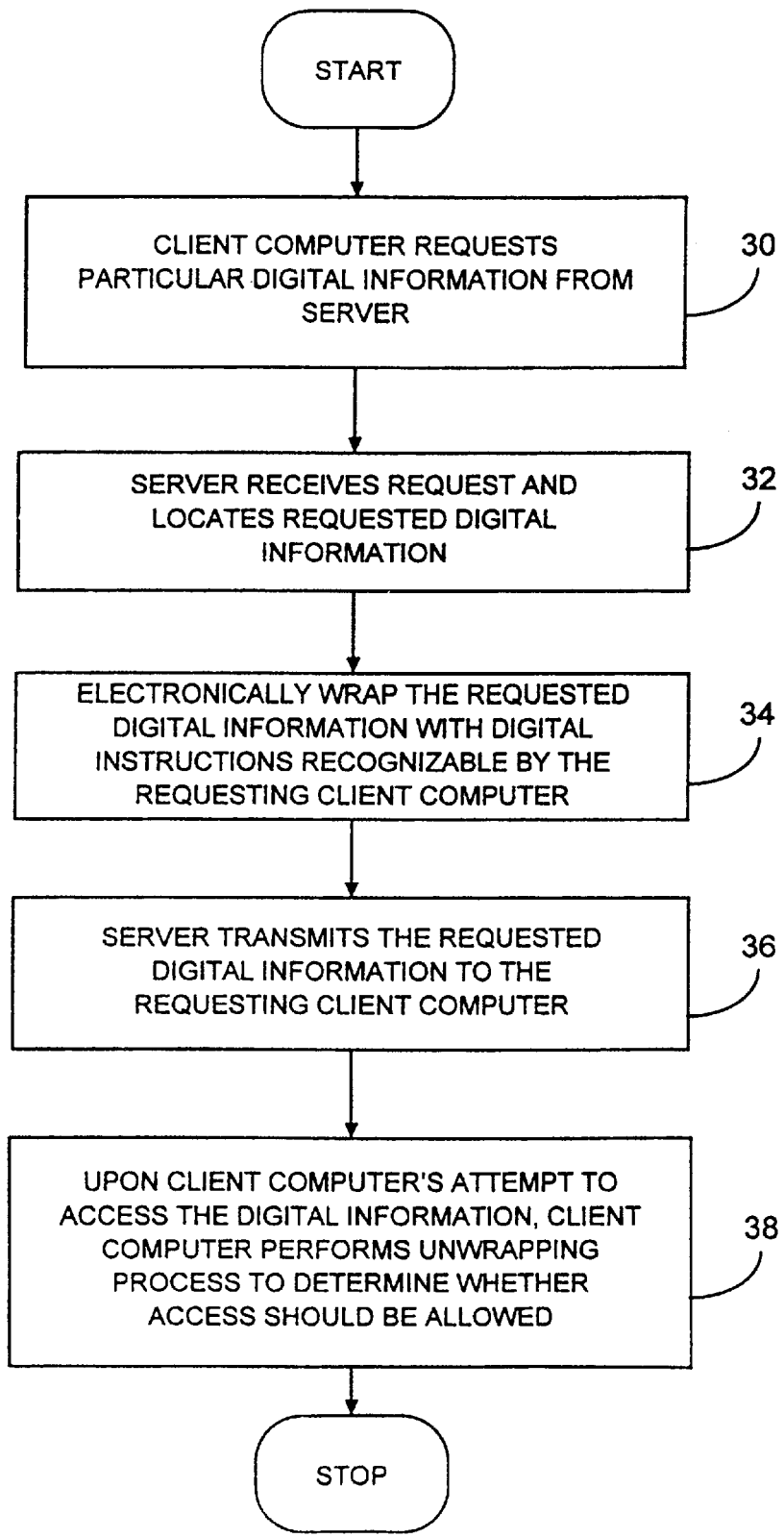
FIG. 2 is a general flow diagram of a digital information transmission and payment validation method provided by the present invention.

FIG. 2 is a general flow diagram of the digital information transmission and payment validation in accordance with the present invention. For the example of FIG. 2, it will be assumed that the digital information to be provided from the vendors 20 to the server 14 and ultimately to the client computers 12 includes software products, and further that the users at the client computers 12 are required to make a payment in order to purchase such software products.

Referring now to FIG. 2, a user may request a particular software product from the server via the client computer, as shown at step 30. In one embodiment of the invention, a list of software products available for downloading from the server is presented to the user via the client computer, and the user selects one or more software products desired from the list.

Step 32 indicates that the server 14 receives the request for one or more software products, and retrieves the requested products. The software products may be stored on the server 14, or may alternatively be downloaded from other computer systems, such as from a plurality of computer systems of software vendors.

In one embodiment of the invention, the server 14 electronically "wraps" the requested software product(s) which have been designated to be transmitted to the requesting client computer 12, as represented by step 34. The wrapping represented by step 34 may be performed on-line or off-line, in which case the resulting wrapped products are stored by the server 14. Furthermore, in one embodiment, wrapping is performed off-line by the software vendors 20, and the wrapped software product is provided to the server 14 electronically or otherwise, where it is stored in its wrapped form. Where the software products are wrapped off-line and stored on the server 14, step 34 may be executed prior to steps 30 and 32.

"Wrapping", as it is used in connection with the present invention, indicates associating digital instructions with the software product which can be executed by the requesting client computer 12 after the client computer 12 receives the software product. The transmission of the software product and the associated digital instructions from the server 14 to the requesting client computer 12 is represented as step 36. The requesting client computer 12 receives the information, and electronically "unwraps" the requested software product upon an attempt to access the software product. "Unwrapping" refers to the process of determining whether access to the wrapped product is to be allowed. This unwrapping occurs in accordance with the digital instructions provided with the requested software product. Where the software product is successfully unwrapped (i.e., execution of the digital instructions indicate that the client computer 12 is authorized to access the software product), the software product may be executed or utilized according to the type of software product. If the unwrapping process determines that the client computer 12 is authorized to access the software product, the client computer 12 is given access to the software product.

Figure 3:
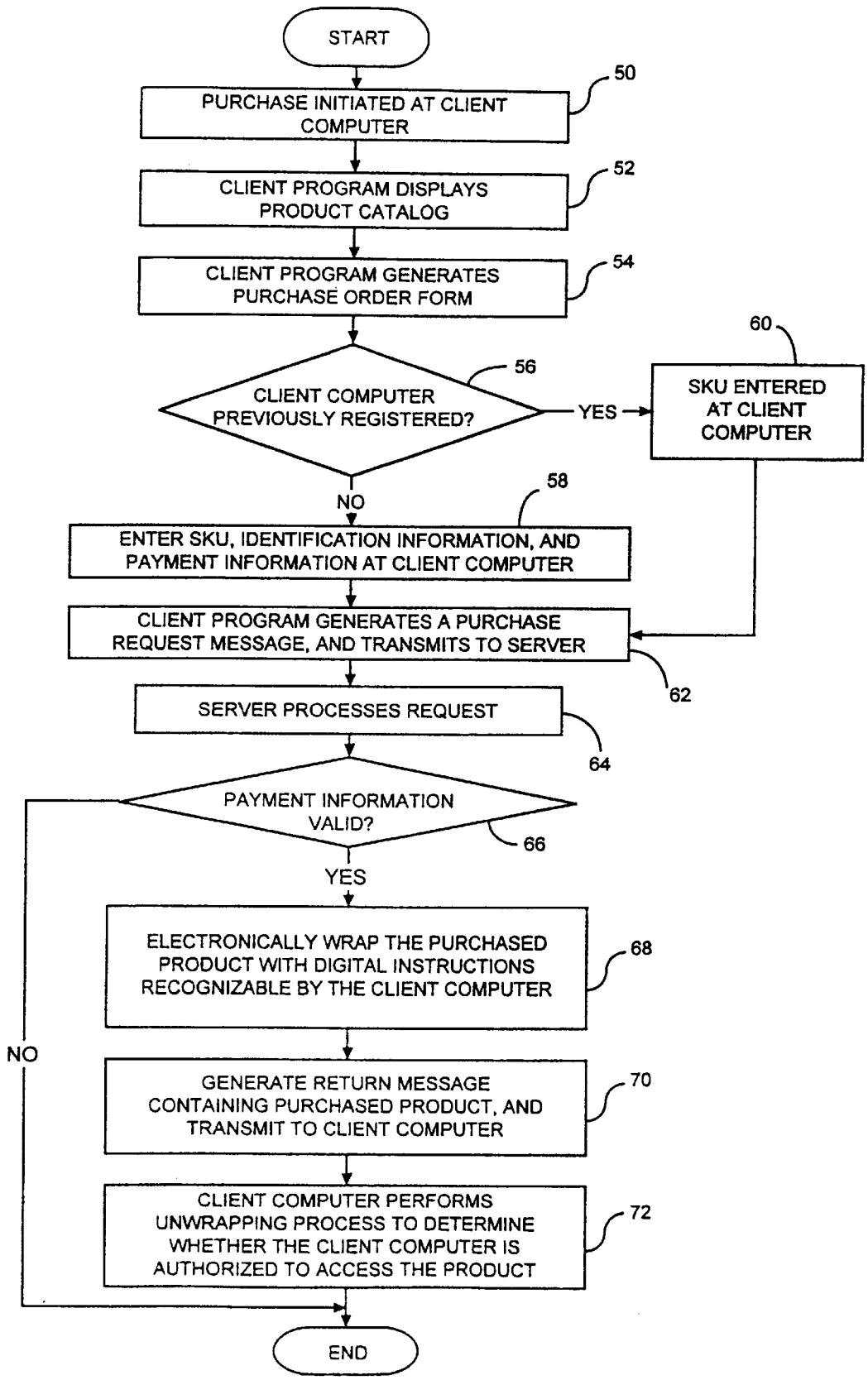
FIG. 3 is a flow diagram illustrating a more detailed embodiment of a digital information transmission and payment validation method provided by the present invention.

FIG. 3 is a flow diagram illustrating a more detailed embodiment of the digital information transmission and payment validation in accordance with the present invention. The user at the client computer 12 initiates a purchase for software product(s), which is represented by step 50. In one embodiment of the invention, this is accomplished by running an ordering program (hereinafter the "client program") on the client computer 12. The client program gives the user of the client computer 12 the tools necessary to see what software products are available and to request downloading of a particular one or more of the software products.

The client program displays a product catalog using a catalog file, illustrated at step 52. The catalog file includes a list of the available software products, including software programs and program features such as executable files, as well as non-executable digital information such as bitmaps, sound files, graphic images and other multimedia content (all generally referred to herein as data or information). Each of the products is identified by the product's Stock Keeping Unit (SKU) or other product identifier, which is used by the user in indicating which of the desired software products is being requested.

At step 54, the client program generates a purchase order form on the client computer 12 that the user completes to designate one or more desired software products. The purchase order form provides for the entry of SKU numbers of the product(s) to be purchased, user's name, account number and credit card number.

However, in one embodiment of the invention, much of this information need only be entered once. The user identification and payment information (including the account number and credit card number) can be entered once by the user upon initial registration with the server 14, so that it does not need to be entered each time a software product is requested. Decision step 56 determines whether the client computer 12 has been previously registered. If it has not been previously registered, the user enters the registration information (identification and payment information) and the SKU number(s) corresponding to the software products desired, as shown at step 58. If the client computer 12 has been previously registered, only the SKU number(s) need to be entered, as illustrated at step 60. Note that in one embodiment of the invention, identification and payment information is only transmitted once to the server 14, where the information is stored. This information is also stored on the client computer 12, such that at the time of a subsequent purchase, the user again enters this information, but it is not transmitted to the server 14. Instead, the client computer 12 uses the information to verify the user by comparing the stored information to the entered information. The user is allowed to request desired software products only if this information matches.

After the SKU number has been entered at step 60, or the SKU number and registration information at step 58, the client program generates a purchase request message that is transmitted to the server 14 for processing, as illustrated by step 62. The purchase request message is preferably encrypted for system security. The server 14 processes the request at step 64, which includes receiving the request and determining whether the requested software products are available to be transmitted to the client computer 12. Where the purchase request message was transmitted to the server 14 in encrypted form, step 64 further includes decrypting the purchase request message.

The validity of the payment information is verified at decision step 66. This includes verifying the availability of funds and/or credit for that particular client computer 12. For example, a credit verification includes an inquiry to a credit card company to verify the status of the user's credit card and available credit. In one embodiment, the user's credit card number is electronically transmitted to the server 14 (at initial registration) where it is stored, so that the sensitive credit card information need only be transmitted once. The electrical transmission is preferably performed by transmitting the credit card information in encrypted form by way of a direct telephone line connection for security purposes. The server 14 then verifies the credit card information with the credit card company.

The credit verification inquiry from the server 14 includes the formulation of a credit verification message to the credit card company, bank, or similar financial institution to verify the payment method. The credit card company or other financial institution returns authentication and verification information to the server 12. Where the authentication and verification information indicates that the payment information is not valid, the server 14 will not transmit the requested software to the client computer 12, and the server 14 sends a return message to the requesting client computer 12 indicating that the requested software will not be transmitted.

Where the authentication and verification information indicates that the payment information is valid, the requested product(s) are prepared to be transmitted to the requesting client computer 12. In one embodiment, this includes electronically wrapping the purchased software product(s) with digital instructions as depicted at step 68. As previously described with respect to a preferred embodiment of the invention, wrapping can be performed on-line or off-line at the server 14 or by the software vendors 20, in which case the resulting wrapped products are stored by the server 14. In the case of off-line wrapping, the wrapping of step 68 may occur at any time prior to transmitting the purchased product to the requesting client computer 12, including prior to the client computer 12 initiating a purchase at step 50. Wrapping, as introduced in step 34 of FIG. 2, is described in greater detail in connection with FIG. 4.

A return message containing the purchased product is then transmitted to the requesting client computer 12, as shown at step 70. The return message is preferably encrypted to provide enhanced security. The purchased software product, in wrapped form, is included in the return message to the requesting client computer 12. In one embodiment, the client computer 12 receives and stores the purchased product on the client computer's 12 hard drive. The wrapper on the purchased product controls access to the product. When an attempt is made to access the product, the wrapper determines whether access should be allowed. If access should be allowed, the wrapper gives the client computer 12 access to the product. The process of executing the digital instructions in order to determine whether the client computer 12 is granted access to the product is referred to herein as "unwrapping" the product. Where access is granted, the requested software product is said to be successfully "unwrapped", such that it can be accessed by the user. Where access is not granted, the requested software product is said to remain "wrapped" and therefore is not accessible by the user. Unwrapping, as introduced in step 38 of FIG. 2, is described in greater detail in connection with FIG. 4.

Figure 4:
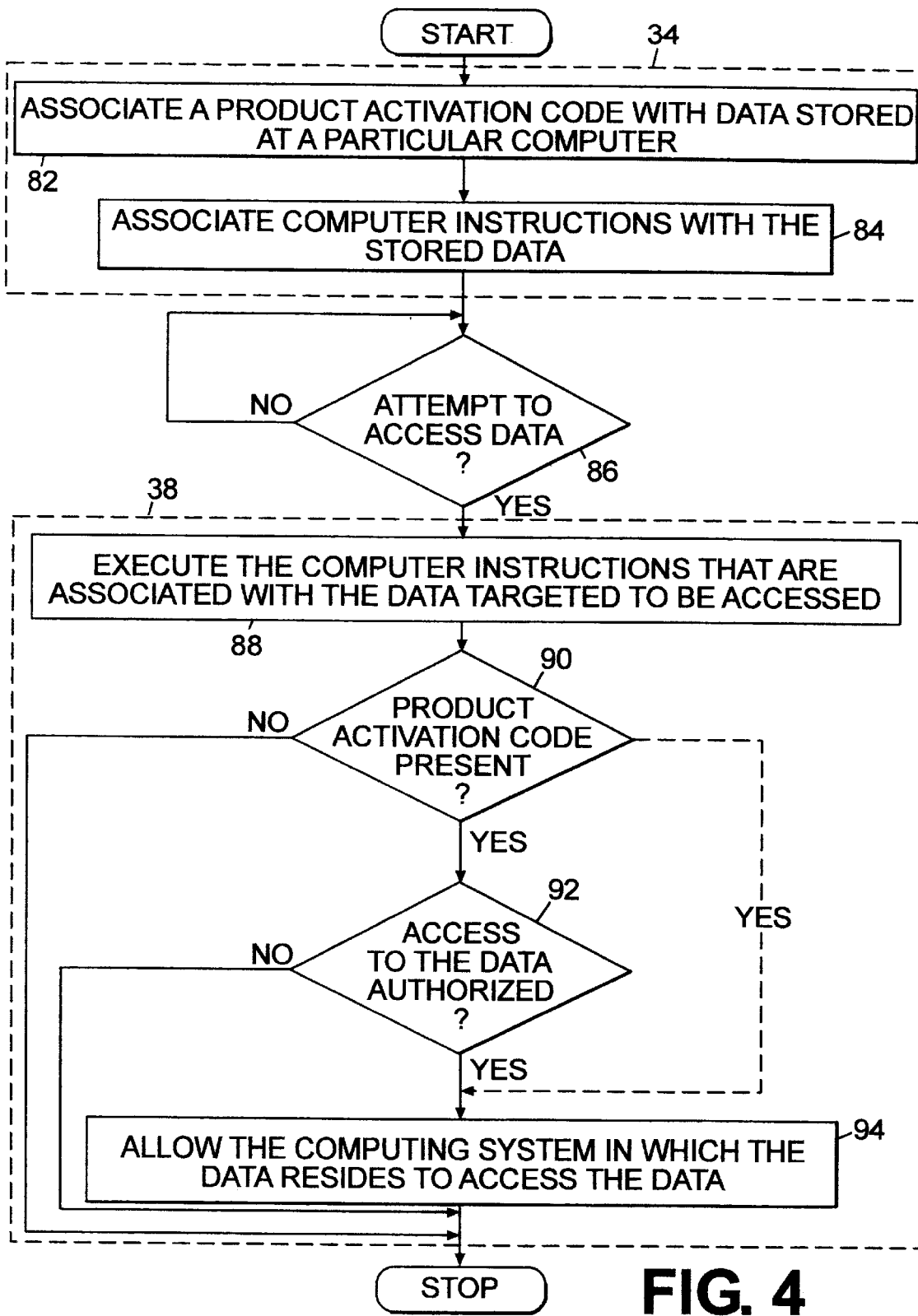
FIG. 4 is a general flow diagram of one embodiment of an electronic wrapping and unwrapping method provided by the present invention.

FIG. 4 is a general flow diagram of one embodiment of the electronic wrapping and unwrapping in accordance with the present invention. Data stored in a computer can be electronically wrapped as was represented by step 34 of FIG. 2. In the embodiment described here, the wrapping step 34 of FIG. 2 includes steps 82 and 84 as shown in FIG. 4. At step 82, a product activation code is associated with the data. The product activation code can take on various formats, including a binary value, a digital flag, or a field of a binary value. The product activation code may also be represented by the presence or absence of a particular field, flag, or value, as in one embodiment of the present invention. In this embodiment, the product activation code is represented by the presence or absence of a digital token which is used to control access to the data.

In one embodiment of the invention, the digital token is associated with the data at a server computer system prior to being transmitted to a recipient client server system. The association of a digital token to particular data indicates that the data has been validly requested and received by the client computer system 12 from the server computer system 14. A valid request in one embodiment of the invention includes requesting the data and making payment for the requested data, in which case the server computer system attaches the digital token to the requested data prior to transmitting the requested data to the client computer system. This digital token is subsequently used by the client computer system to determine whether-the data has been validly purchased.

To control the client computer system's access to requested data which has been received from the server computer system, one or more computer instructions are also associated with the data stored in the storage device during the wrapping step 34 as illustrated at step 84. These computer instructions essentially "wrap" the requested data by embedding the requested data within the computer instructions such that the data cannot be extracted without successfully executing the computer instructions. In one embodiment of the invention, the computer instructions are organized into an executable file such that the computer instructions are performed when an attempt is made to access the data.

Decision step 86 represents the event wherein the computing system attempts to access the data. When an attempt to access the data occurs, the computing system electronically performs the unwrapping process, as was described in the client/server system step 38 of FIG. 2. In FIG. 4, one embodiment of the unwrapping step 38 is depicted having steps 88, 90, 92 and 94.

When the computer system attempts to access the data, the computer instructions that are associated with that data are executed, as shown at step 88. These computer instructions may be executed by initiating an executable file comprising the computer instructions. These computer instructions perform various tasks, including determining whether the product activation code is present, as seen at decision step 90. Where a product activation code is not present, processing ends, and the data cannot be accessed by that computer. This authorization verification provides a safeguard against software pirating, whereby non-purchased software is copied from one computer system onto another computer system. In such a case, the product activation code would not be present, thereby disallowing the pirating computer system to access the data.

Where the product activation code is present at decision step 90, processing continues to decision step 92 where the product activation code can be examined to determine whether it indicates that access to the data is authorized. Therefore, in one embodiment of the invention, the product activation code comprises a digital value within a field or flag which indicates whether the data is authorized to be accessed. However, in one preferred embodiment, the presence of the product activation code itself indicates whether access to the data is authorized. For example, rather than providing a particular binary value or flag indicative of the access rights to the data, the presence of a predetermined type of activation code itself will indicate that data access is authorized. In one embodiment of the present invention, this product activation code is a digital token, the existence of which indicates that access to the data is authorized. Processing continues from decision step 90 or 92 at step 94, where the computing system in which the data resides is allowed to access the data.

Figure 5:
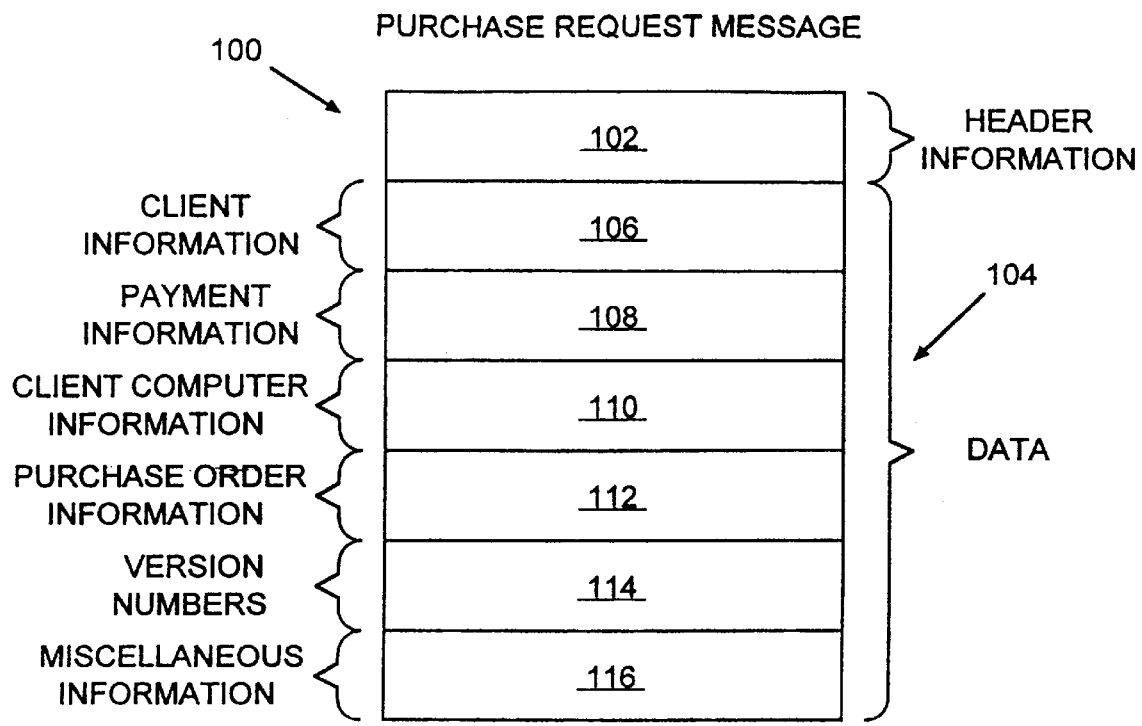
FIG. 5 illustrates one embodiment of the structure of a purchase request message sent from a client computer to a server computer in accordance with certain aspects of the invention.

FIG. 5 illustrates one embodiment of the structure 100 of the purchase request message sent from the client computer 12 to the server 14. The purchase request message is generated by the client program based on the information entered in the purchase order form at the client computer 12.

In this example of the purchase request message, the structure 100 includes header information 102 and data 104. The header information 102 generally would also include channel and path information to direct the message to its destination.

The data 104 includes client information 106, payment information 108, client computer information 110, purchase order information 112, version numbers 114, and miscellaneous information 116. The client information 106 includes information such as the client computer user's name, address, telephone number, etc. The payment information 108 includes an account number for use by the server 14, as well as other payment information including, where applicable, a credit card number. The client computer information 110 provides information regarding the client computer's operating system, the language (e.g., English), etc.

The purchase order information 112 identifies the products designated by the user to be purchased and their corresponding SKU numbers, as well as the prices corresponding to each of those products. The version numbers 114 identify the version of the product information available to the user via the catalog file on the client computer 12, so that the server 14 can determine whether the user has the most up-to-date catalog file available. The miscellaneous information 116 represents additional or optional data which may be included in the purchase request message structure 100. The purchase request message is preferably encrypted prior to being sent to the server 14, necessitating that the server 14 decrypt the purchase request message.

Figure 6:
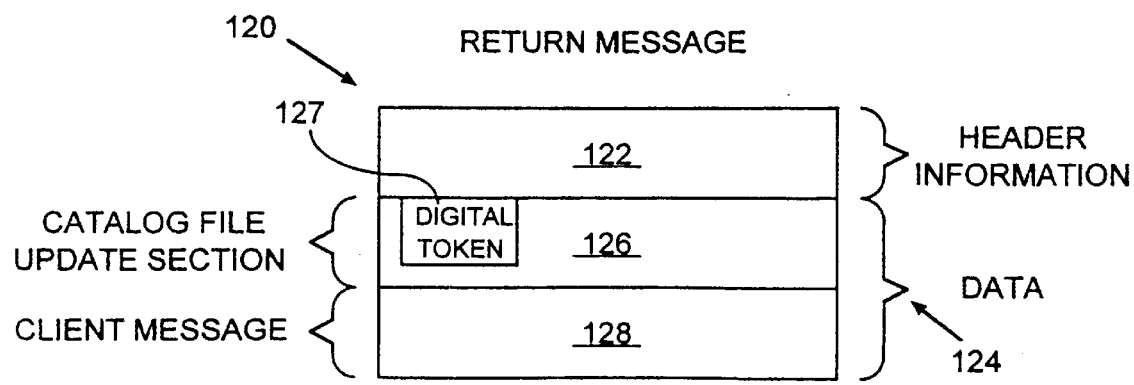
FIG. 6 illustrates the structure of one embodiment of a return message sent from a server computer to a client computer in response to a purchase request message, in accordance with other aspects of the invention.

FIG. 6 illustrates the structure 120 of the return message sent from the server 14 to the client computer 12 in response to the purchase request message. The return message structure 120 includes header information 122 and data 124. The header information generally would also include channel and path information to direct the message to its destination.

The data 124 includes a catalog file update section 126 and a client message 128. For each purchased product, the catalog file update section 126 contains the product SKU number, the description of the product, the product itself, a product file header, and a digital token 127. A digital token 127 is included within the catalog file update section 126 to allow access to the data 124 by detection of the digital token during the unwrapping process. The client message 128 includes any information to be relayed to the user at the client computer 12. The return message is preferably encrypted for security purposes, necessitating that the client program decrypt the return message.

The client program merges the catalog file update section 126 into the catalog file. The catalog file is therefore updated to contain the product, the product file header, and the digital token, as will be described in further detail in connection with FIG. 7.

Figure 7:
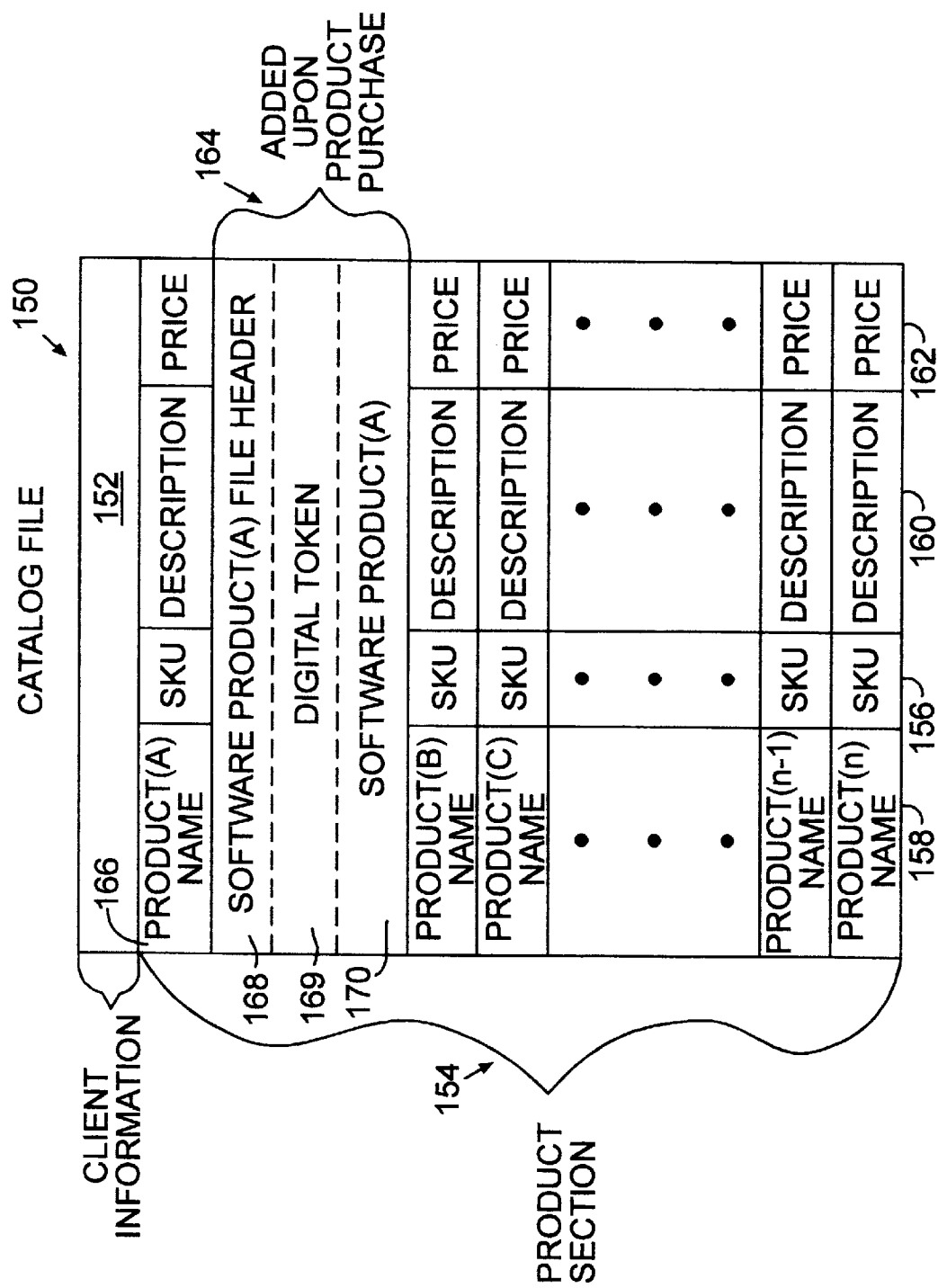
FIG. 7 illustrates one embodiment of the structure of a catalog file formed in accordance with the invention.

FIG. 7 illustrates the structure 150 of the catalog file which resides at the client computer 12. The catalog file includes a product catalog which lists each of the products available to the user of the client computer. These products may include digital information which can be downloaded to the client computer 12 from the server 14, or which can be ordered through a third-party fulfillment house. Where a third-party fulfillment house is used, the server 14 sends a message to a third-party fulfillment house which in turn ships the requested product(s) or electronically transmits the ordered product(s) to the client computer 12 (or to a different site if requested by the client computer 12). Therefore, rather than the server 14 downloading the ordered product(s) directly to the client computer 12, the server 14 makes a request to a third-party fulfillment house to perform this task. Transfer of purchase orders to third party fulfillment houses may be by, for example, electronic data interface (EDI) transfers.

In order to designate particular products to be ordered by the user, the user of the client computer 12 enters the SKU number of the product(s) to be purchased, as well as his/her name, account number, and credit card number. This information is entered by the user into a purchase order form, which generates the purchase request message described in connection with FIG. 5.

The structure 150 of the catalog file includes client information 152 and a product section 154. The client information 152 includes the name, address, phone number, and other user-specific information. The product section 154 contains a list of products, software products in the present example, which can be purchased. The software products can include any digital information desired by the user, including software programs and program features (e.g., executable files), as well as non-executable digital information and multimedia content (e.g., bitmaps, sound files, graphic images). The list of software products forms the product catalog from which the user can select desired products. Each available product is identified in the product section by a SKU number in the SKU field 156. For each available product, a product name in the PRODUCT NAME field 158 is listed, as is a description of the product and its corresponding cost in the DESCRIPTION field 160 and PRICE field 162 respectively.

When a product is purchased or otherwise received by the client computer 12, the information returned to the client computer 12 in the catalog file update section 126 of the return message includes a product file header, a digital token, and the digital product itself. This is shown in the product purchase area 164 of the catalog file. In other words, where a product has been designated to be purchased, such as a product A in the PRODUCT(A) NAME field 166, the received digital product is inserted into the catalog file upon its purchase. In the product purchase area 164, the digital information corresponding to the product A file header is appended to the software product A itself, which are respectively shown in the SOFTWARE PRODUCT(A) FILE HEADER field 168 and the SOFTWARE PRODUCT(A) field 170. The DIGITAL TOKEN field 169 is also included in the product purchase area 164 to provide the digital token to the client computer 12. In one preferred embodiment of the invention, for a particular product, the same digital token is used for each purchase of that product; thus, each client computer receiving that product receives the same digital token. In such an embodiment, the digital token is not a function of the client computer. However, in one preferred embodiment, the digital token is a function of the purchased product.

The product(A) software in the SOFTWARE PRODUCT (A) field 170 can be utilized by the user of the client program upon successful validation. The product file header in one embodiment of the invention includes the product's SKU number, the product's file size, the product type (e.g., software executable or text), the command used to launch the product, whether the product is to be extracted to a file location on the client computer's hard disk outside of the catalog file, the name of such an extracted file saved on the hard disk, and whether the product is to be automatically launched upon purchase.

Figure 8:
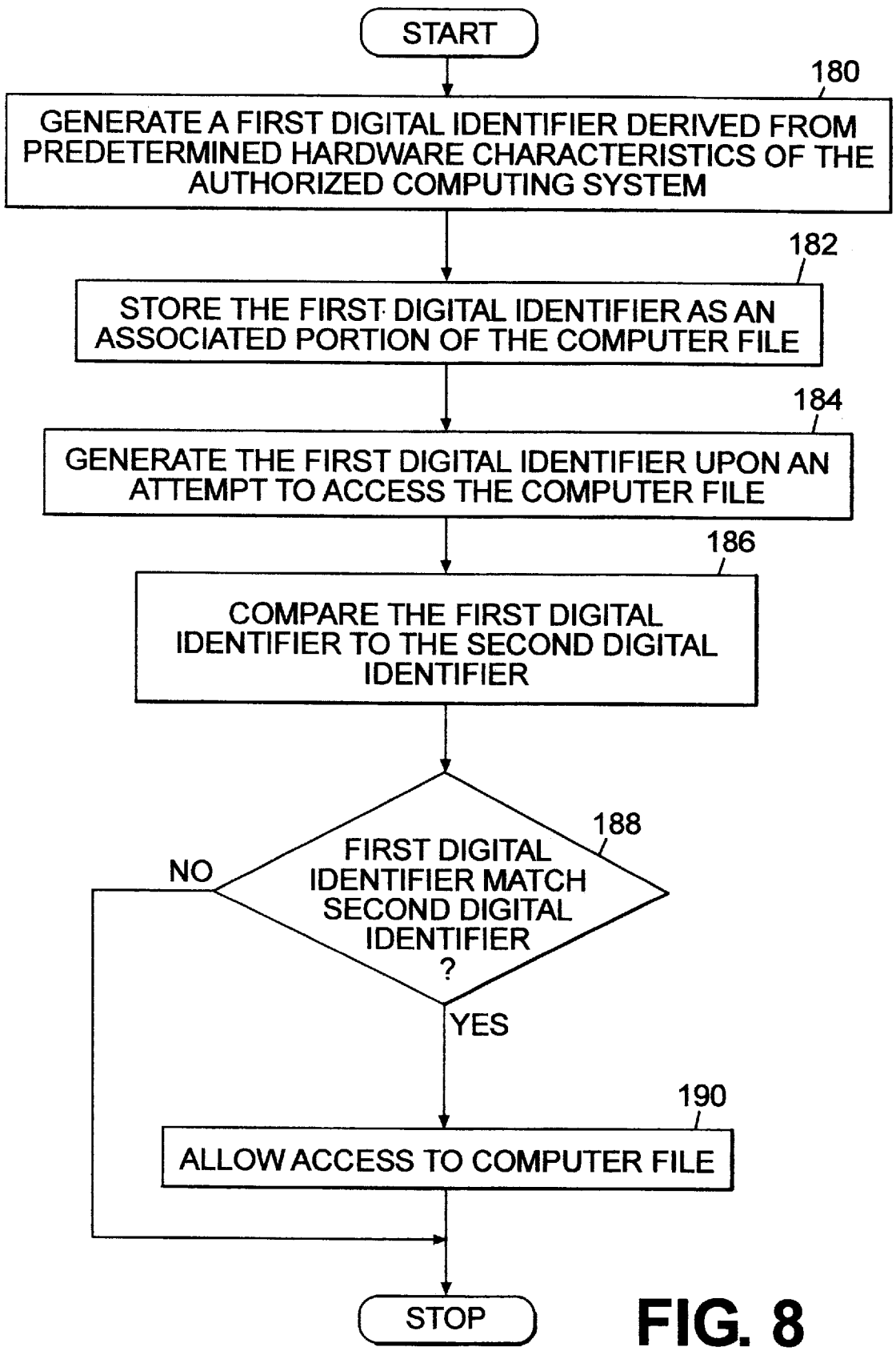
FIG. 8 is a general flow diagram of one embodiment of a method according to the invention, which securely associates a computer file with a particular computing system to prevent other computing systems from accessing the computer file.

FIG. 8 is a general flow diagram of one embodiment of the invention which securely associates a computer file with a particular computing system to prevent other computing systems from accessing the computer file. The computer file can therefore be locked to a particular computing system to deter unauthorized copying of software to unregistered computing systems. The present invention utilizes a digital identification scheme to allow the computer file to be accessed by the computing system only when the computer file includes the digital identification of the registered computing system.

The first step in associating the computer file with a particular computing system is to generate a first digital identifier which is derived from predetermined hardware characteristics of the authorized computing system. A computing system will be authorized to generate the first digital identifier if that computing system includes the required client program which generates the first digital identifier. The generation of the first digital identifier is represented at step 180. At step 182, the first digital identifier is stored so as to be associated with the computer file that is to be locked to the computing system. In one embodiment of the invention, this is accomplished by storing the generated first digital identifier into the computer file itself. The first digital identifier is essentially dormant while stored in the computer file of the computing system, until an attempt is made to access the computer file within the computing system. At such time, a second digital identifier is generated within the computing system, as shown in step 184. The second digital identifier is derived from the same predetermined hardware characteristics of the client computer using the same algorithm as was used in the generation of the first digital identifier in step 180.

When the second digital identifier has been generated, it is compared to the first digital identifier as shown in step 186. Where the first digital identifier and the second digital identifier match at decision step 188, the computing system is allowed to access the computer file as shown in step 190. Otherwise, where the digital identifiers do not match, processing ends. This occurs where the client computer generating the second digital identifier is not the same client computer that generated the first digital identifier.

More specifically, generating the first digital identifier includes generating a first unique fingerprint derived from predetermined hardware attributes of the computing system, including but not limited to the serial number of one or more components in the client computer (e.g., a network card). The level of security can be increased by increasing the number of hardware characteristics used to generate the fingerprint. The first fingerprint is stored within the catalog file, which in one preferred embodiment is the file that is to be locked to the client computer. In one preferred embodiment, the fingerprint is not a function of the purchased products or the catalog file, and a single fingerprint is used to lock the catalog file to a particular client computer.

When a client computer 12 attempts to access the locked computer file, such as the catalog file, a second unique digital fingerprint is generated at that time. A deterministic algorithm is used to generate the first digital fingerprint, and the same algorithm is used in generating the second digital fingerprint. Because the first digital fingerprint is stored with the catalog file, which could possibly be copied to an unauthorized client computer, the generation of the second digital fingerprint causes the client computer attempting to access the file to incorporate its hardware characteristics into the second digital fingerprint. Therefore, the catalog file will always be associated with the registered client computer 12 which was authorized to access the catalog file, but the second digital fingerprint will be generated from whichever computing system attempts to access the catalog file. A comparison of the first and second digital fingerprints therefore provides a manner in which it can be determined whether the catalog file is attempting to be accessed by the same client computer 12 which originally generated the first digital fingerprint.

Where the first and second digital fingerprints match, the client computer will be allowed to access the catalog file, which in turn allows the user of that client computer 12 to make requests to the server 14. Where the digital fingerprints do not match, the client computer will not be allowed to open the catalog file, thereby preventing a user of the unauthorized client computer from placing orders to the server. Furthermore, because purchased software products are stored as a part of the catalog file when downloaded to a client computer 12, an unauthorized client computer is also not able to retrieve previously purchased software products because the catalog file cannot be accessed by the unauthorized client computer. This prevents unauthorized client computers from accessing previously purchased software products which are stored on an unauthorized client computer.

It should be recognized that other computer files other than the catalog file can similarly be locked to a particular computer. For example, the client program that generates purchase request messages can also be locked to a client computer which has been registered with the server 14.

To further enhance security, the catalog file storing the first digital fingerprint can be encrypted. A client computer 12 attempting to access the catalog file would therefore also be required to be able to decrypt the catalog file. Therefore, a successful decryption of the catalog file would be required before one could even attempt to locate the first digital fingerprint stored within the catalog file. This additional level of security makes it even more difficult for unauthorized client computers to access non-purchased products.

Figure 9A:
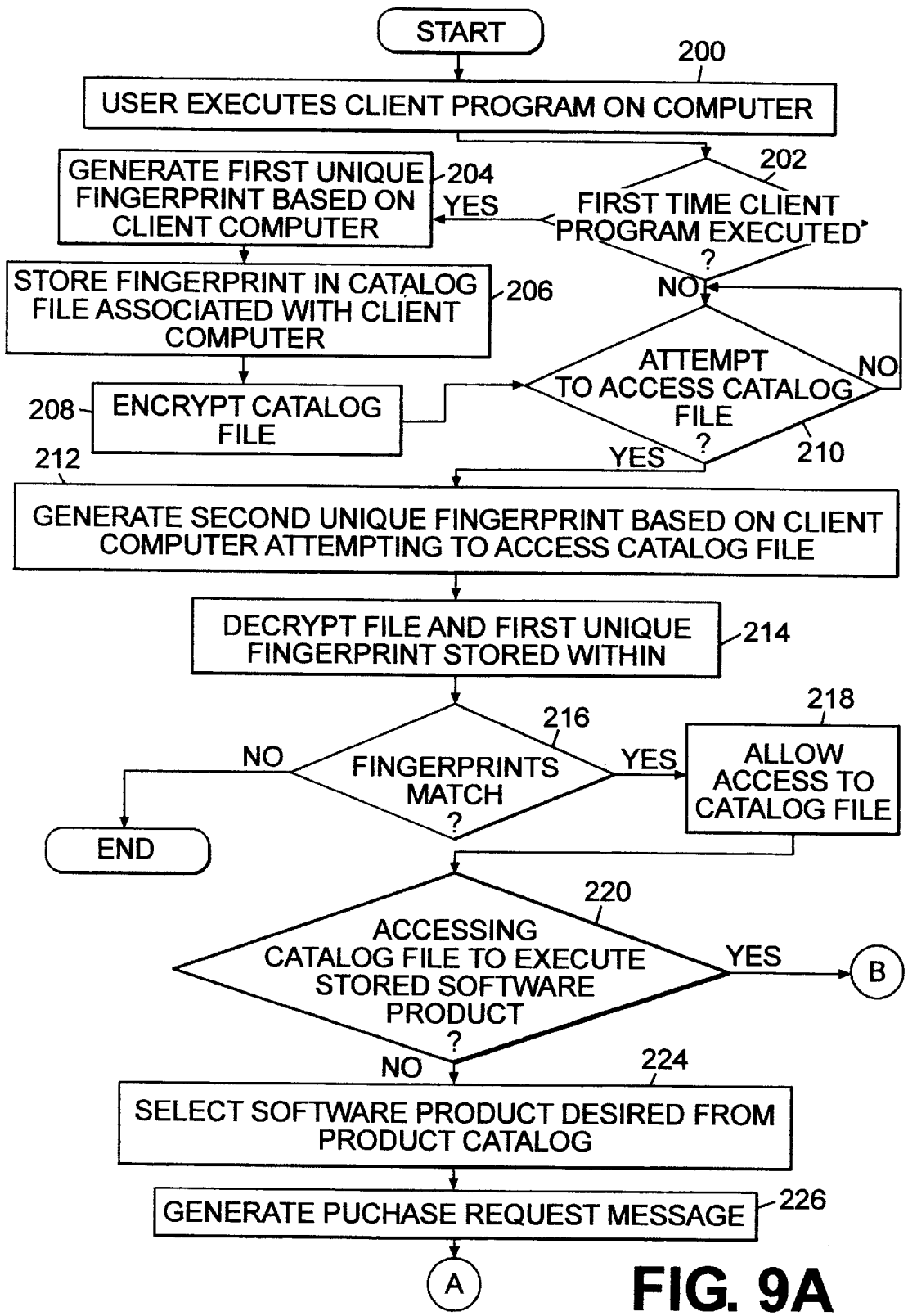
FIGS. 9A–9B together comprise a flow diagram illustrating a combination of the various information security verification schemes provided by one embodiment of the present invention.
Figure 9B:
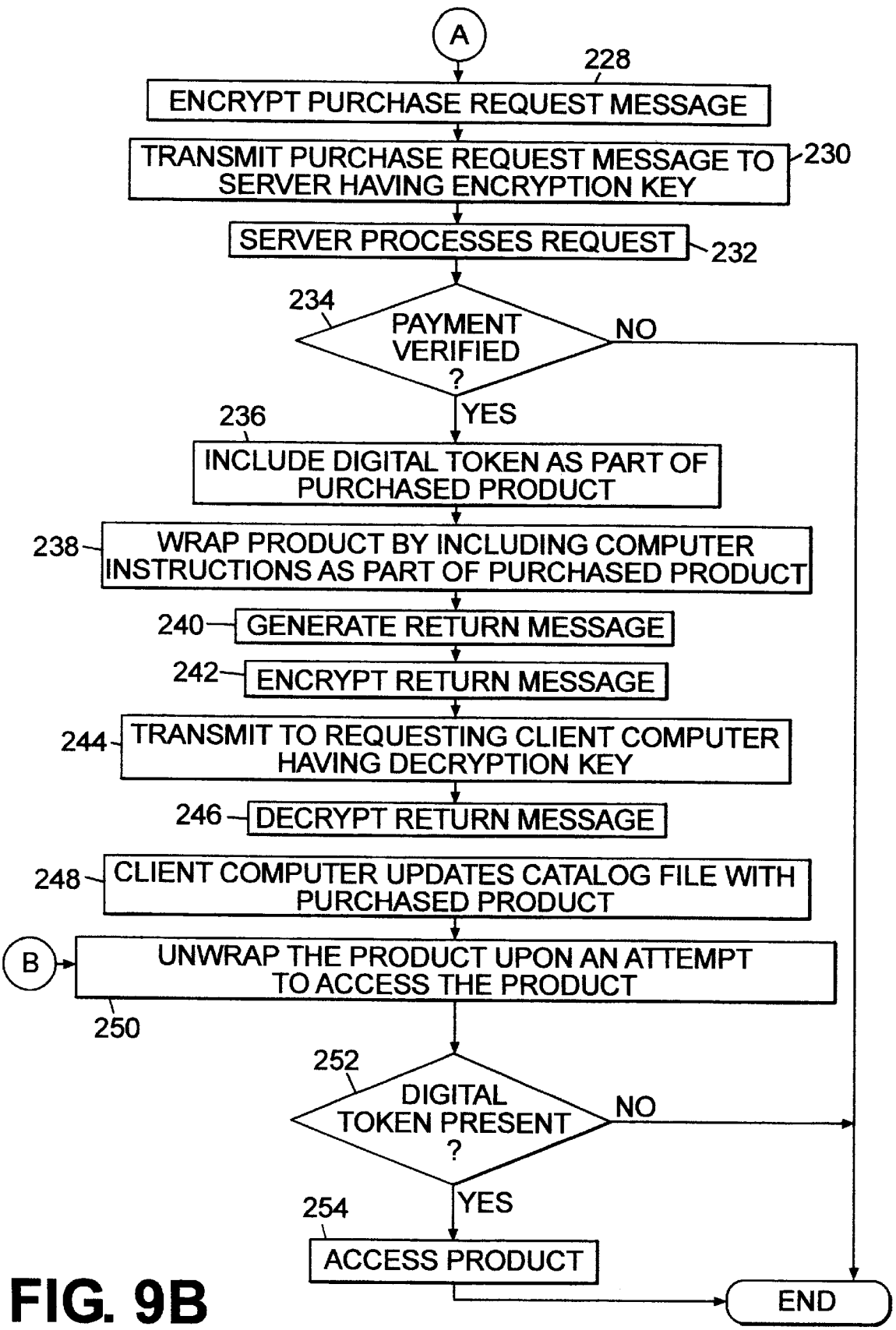

FIGS. 9A–9B together comprise a flow diagram illustrating a combination of the various information security verification schemes of one embodiment of the present invention. Referring now to FIG. 9A, the user executes the client program on the client computer 12, shown at step 200. The client program operates on the client computer 12 to provide ordering capabilities to the user. Decision step 202 determines whether it is the first time that the client program has been executed. If so, a first unique digital fingerprint is generated at step 204, where the first unique digital fingerprint is based on the client computer executing the client program. The fingerprint is stored in the catalog file associated with the client computer 12 at step 206. The catalog file and it's integrated fingerprint are encrypted and stored at step 208.

Where the catalog file has been encrypted and stored (step 208), and also where it is not the first time the client program has been executed (step 202), processing continues to decision step 210. Decision step 210 monitors for an attempt to access the catalog file from any computer. While there is no attempt, processing returns to decision step 210 until such an attempt is made. It should be recognized that other functions can be carried out on either the client computer 12 or the server 14 during this time. It should also be recognized that a monitor loop is not required to carry out the function of determining whether an attempt to access the catalog file has occurred, as other methods may be used (e.g., interrupt-driven notification).

Where a computer has attempted to access the catalog file, the second unique fingerprint is generated at step 212. The second unique digital fingerprint is based on the client computer attempting to access the client program. At step 214 the catalog file is decrypted to extract the first fingerprint, and the first and second fingerprints are compared at decision step 216. If the fingerprints do not match, no access to the catalog file is authorized and processing ends. If the fingerprints match, the user at that client computer will be allowed to access the catalog file, as depicted in step 218.

There can be various reasons for accessing the catalog file. First, the user may want to access the catalog file to determine what software products are available from the server 14. Second, because the previously purchased software products are stored as part of the catalog file, the user may want to access the previously purchased software product itself. Where access to a software product itself is desired as shown in decision step 220, access to the product is allowed where the product is successfully unwrapped as indicated at steps 250, 252 and 254 of FIG. 9B. Otherwise, step 224 indicates that the user is allowed to select a desired software product from the product catalog, which lists the products stored in the catalog file.

As previously indicated, the product file header can designate various parameters and options, including whether the product is to be extracted to a file location on the client computer's hard disk outside of the catalog file and the name of such file, and whether the product is to be automatically launched upon purchase. Where the product is extracted to a different part of the permanent storage, the product itself may not be stored in the catalog file, but instead is extracted in wrapped form so that the product continues to require unwrapping prior to each use. If the product file header indicates that the product is to be automatically extracted, a copy of the file is stored on the client computer 12 hard drive outside of the catalog file. However, the product file header is still stored in the catalog file. In one embodiment, the product is extracted from the catalog file prior to execution (i.e., the product is copied to another location on the client computer's hard drive). The extracted file may then be executed upon successful unwrapping. If the product file header indicates that the product is to be launched upon purchase, the client program causes the product to be launched upon receipt and successful unwrapping, without requiring a request by the user to access the product.

When one or more products have been selected to be purchased, the purchase request message is generated at step 226. Control transfers to step 228 of FIG. 9B via "A", where the purchase request message is encrypted. The encrypted purchase request message is transmitted to the server at step 230. The server receiving the encrypted purchase request message must be able to decrypt the message. Various encryption algorithms may be used without departing from the scope and spirit of the invention.

In one embodiment of the invention, communications between client computers 12 and the server 14 are encrypted using sets of encryption keys. A different set of encryption keys is used for each client computer. The first time a client computer 12 communicates with the server 14, the client computer 12 registers with the server 14. As part of the registration process, the server 14 transmits to the client computer 12 the set of encryption keys to be used by that particular client computer. The client program stores the set of encryption keys on the client computer. The server 14 maintains a record of the set of encryption keys provided to the client computer. Each set of encryption keys is indexed, so that for a particular set of encryption keys, an individual encryption key can be identified by its index in that set. Thereafter, communications between the client computer 12 and the server 14 are encrypted and decrypted according to the set of encryption keys for that client computer.

When the server 14 has processed the request at step 232, the server 14 determines whether the payment method and/or amount is valid at decision step 234. If it is not valid, the process ends. If the payment method/amount is successfully verified, and the product has not previously been wrapped off-line, the product is "wrapped" by including computer instructions and the digital token as part of the purchased product, as seen in steps 236 and 238. These steps 236 and 236 may be performed off-line at the server 14 or by the vendor of the software product. When executed, the computer instructions that are included with the software products by the wrapping access the client program to confirm that a software product on the client computer has been validly purchased.

The server 14 generates a return message, encrypts it, and transmits it to the requesting client computer 12, as seen in steps 240, 242 and 244 respectively. The return message is as shown in FIG. 6, with the product and product file header as part of the catalog file update section 126. The client computer 12 then decrypts the return message at step 246. The client computer 12 must have the necessary decryption keys in order to decrypt the return message.

The client computer 12 updates the catalog file with the purchased product at step 248, also illustrated as software product (A) 170 in FIG. 7. The product is unwrapped upon an attempt to access the product as shown at step 250. The product is unwrapped by executing the computer instructions associated with the software product at the wrapping step 238. Among these instructions are commands to have the client program search for a digital token, which is performed at decision step 252. Where a digital token is not present, the process ends. Where a digital token is present, access to the product is authorized at step 254. In one embodiment of the invention, the digital token can be accessed only after the fingerprint verification of the catalog file has successfully completed.

Figure 10:
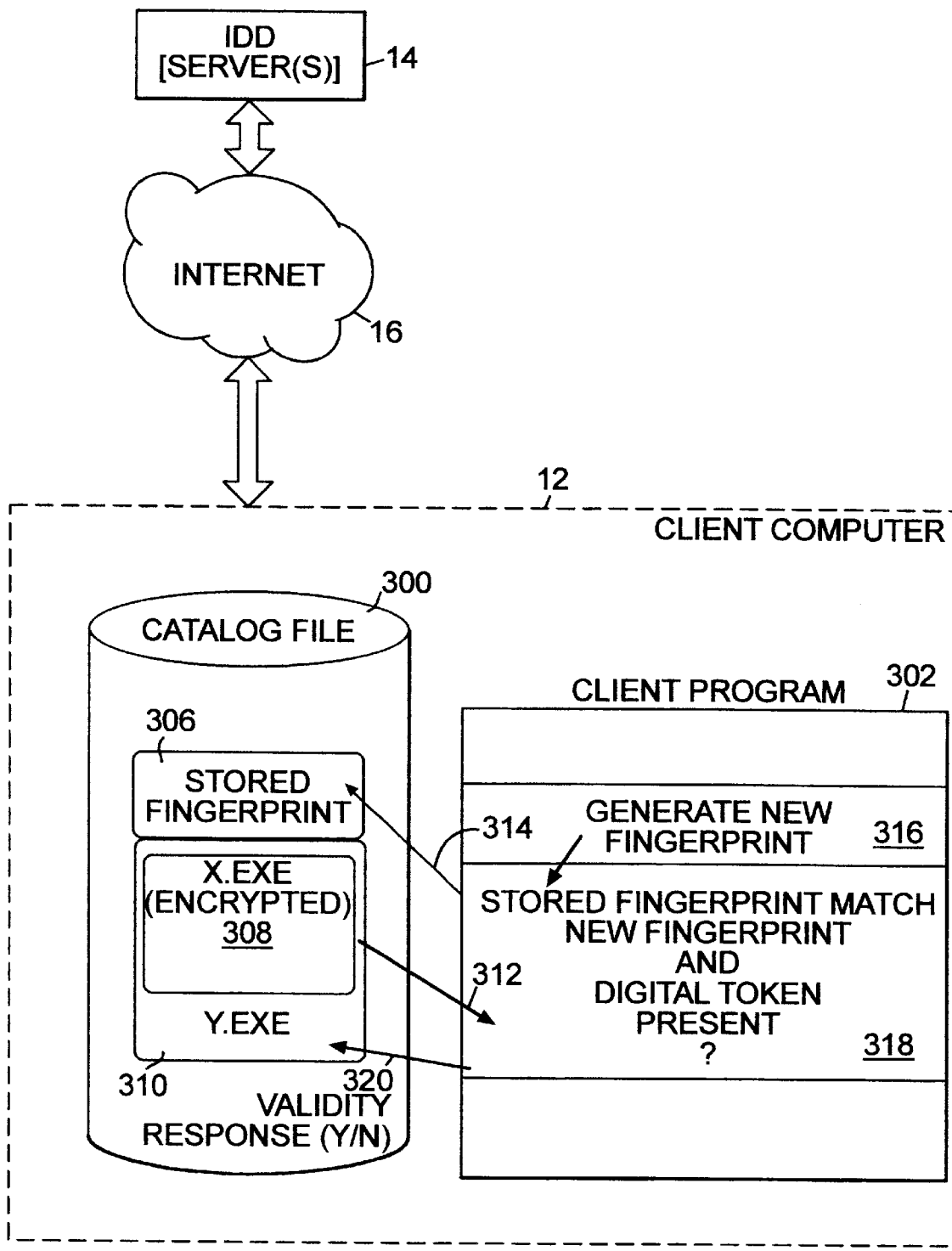
FIG. 10 is a block diagram illustrating the interaction between the catalog file and a client program within the client computer according to certain aspects of the invention.

FIG. 10 conceptually illustrates the interaction between the client program 302, products 308 and the catalog file 300 within the client computer 12. In order to determine whether a particular client computer has access to the entire catalog file 300 including any purchased software contained therein, the client program 302 accesses a portion of the catalog file 300 within the hard drive of the client computer 12.

In one embodiment of the invention, the validation process determines whether the catalog file is valid and contains a digital token for the software product or program feature. As previously described, the catalog file is validated by confirming that the digital fingerprint stored in the catalog file is the same as the digital fingerprint generated upon an attempt to access the catalog file. Further, the software product is validated by confirming that a digital token is present. Each of these validations includes a communication comprising a validation inquiry by the client program 302, in part by accessing the catalog file 300.

The validation inquiry by the client program 302 may be individually performed, such that a first inquiry of the catalog file 300 inquires as to whether the catalog file is valid, and a second inquiry of the catalog file inquires as to whether the software product is authorized to be accessed. Two validity responses can be used in this situation. However, the inquiry can be combined such that both validation inquiries are combined into a single validation inquiry. A single validation inquiry requires that both the catalog file be valid and that the software product is authorized to be accessed in order to provide a single validity response indicating successful validation. The example of FIG. 10 assumes such a single validation response.

Referring now to FIG. 10, the client computer 12 is shown connected to an Internet channel 16 which is in turn connected to the IDD, or server, 14. The connection between the client computer 12 and the server 14 can alternatively include other types of connections, including a telephone wire connection.

The catalog file 300 is shown including a stored fingerprint 306 representative of the hardware characteristics of the computing system that initially stored the catalog file. The catalog file 300 also depicts a software product 308 which is analogous to the software product(A) 170 of FIG. 7. The software product 308 is illustrated as an executable file (X.EXE) in encrypted form. A greater degree of security is provided by encrypting the software products 308 transmitted from the server 14 to the client computer 12. The wrapper 310, or computer instructions, are also shown as an executable file (Y.EXE), which is depicted as "wrapping" the executable software product 308.

When an attempt is made to access the software product 308, the wrapper 310 of the product 308 initiates an inquiry, shown by line 312, to the client program 302 to determine whether the digital token is present. The stored fingerprint 306 within the catalog file 300 is accessed by the client program 302, to determine whether the catalog file is valid and therefore accessible. Line 314 represents the stored fingerprint 306 access by the client program 302. The validity inquiry represented by line 312 is initiated by the wrapper 310 upon a user's attempt to access the product. The validity inquiry 312 is made by a program call to the client program 302.

Upon receiving the inquiry 312, a routine 316 within the client program 302 generates the client computer fingerprint. The client computer 12 accesses the stored fingerprint 306 in the catalog file 300, as indicated by line 314. The client program 302 then compares the newly-generated fingerprint to the stored fingerprint, and also checks for the presence in the catalog file 300 of the digital token corresponding to the software product, at routine 318. Where either or both of these conditions are not successful (i.e., the stored fingerprint does not match the new fingerprint and/or a digital token is not present), a negative (N) response is provided back to the wrapper 310 via connection 320. In this case, no access will be allowed to the software product 308. Where both of the inquiries are successful (i.e., the stored fingerprint matches the new fingerprint and a digital token is present), an affirmative (Y) response is provided back to the product 310 via connection 320. In this case, access will be allowed to the product 308. If the product 308 is encrypted, this includes the wrapper 310 decrypting the product 308.

In one embodiment of the invention, the validity response traversing connection 320 is in a disguised format. This minimizes the chance of an unauthorized user ascertaining the affirmative validity response, which would result in allowing unauthorized access to the catalog file 300 and the software product 308 through duplication of an affirmative validity response. The disguising may be accomplished using any acceptable method of disguising the answer without departing from the scope and spirit of the invention. In a preferred embodiment of the invention, this disguising is accomplished using a randomized answer, so that the validity response always appears different but recognizable by the wrapper 310.

Figure 11:
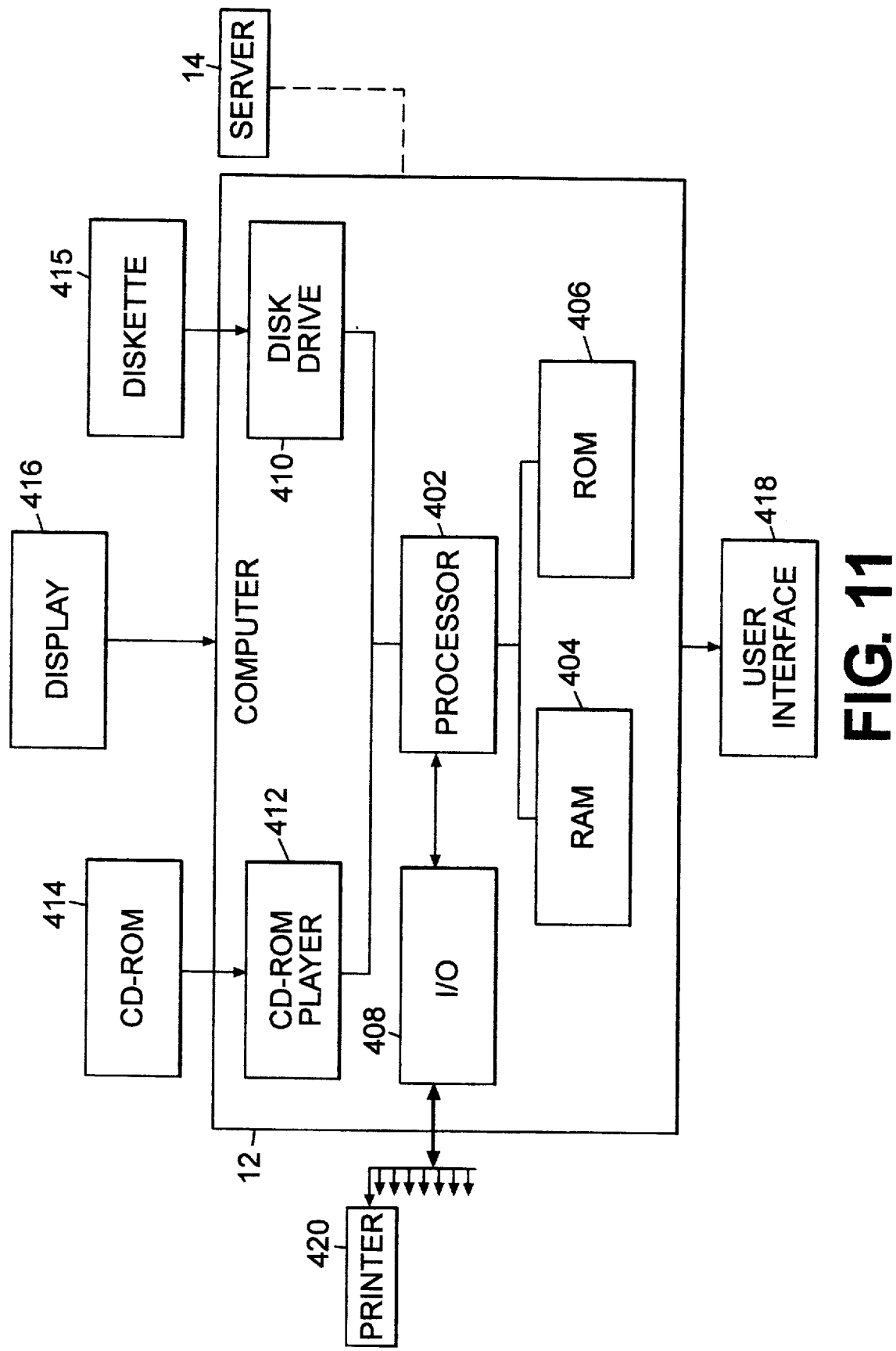
FIG. 11 is a system block diagram of a typical client computer.

Referring now to FIG. 11, a system block diagram of a typical client computer 12 is shown. A client computer 12 suitable for performing the functions in accordance with the present invention typically includes a central processor (CPU) 402 coupled to random access memory (RAM) 404 and read-only memory (ROM) 406. The processor 402 communicates with other internal and external components through input/output (I/O) circuitry and bussing 408. The client computer 12 may also include one or more data storage devices, including hard and floppy disk drives 410 and a CD-ROM drive 412. In one embodiment, software containing client program or catalog file of the present invention may be stored and distributed on a CD-ROM 414, or a diskette 415, which may be inserted into, and read by, the CD-ROM drive 412 or the disk drive 410 respectively. The computer 12 is also coupled to a display 416, a user interface 418 such as a mouse and keyboard, and a printer 420. The user typically inputs, modifies, and executes the various client program routines by interfacing with the client computer 12 through the user interface 418 and display 416.

The invention has been described in various preferred forms, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A computer-implemented method for securing digital information to a first computing system received from a second computing system, the first and second computing systems each including one or more computing devices, the computer-implemented method comprising:

(a) requesting at least a portion of the digital information from the second computing system;

(b) transmitting the requested digital information from the second computing system to the first computing system, the requested digital information being wrapped with digital instructions recognizable by the first computing system; (c) electronically unwrapping the requested digital information at the first computing system in accordance with the digital instructions, wherein when unwrapped, the requested digital information is available for use by the first computing system; and (d) storing a catalog file on the first computing system and electronically locking the catalog file to the first computing system by generating a first digital identifier uniquely corresponding to particular attributes of the first computing system and storing the first digital identifier as an associated portion of the catalog file, wherein the catalog file identifies the digital information available to be transmitted from the second computing system;

wherein a determination is made as to whether the catalog file is validly located on a computing system by:

(a) generating a second digital identifier; and (b) comparing the first digital identifier to the second digital identifier to determine whether the first digital identifier corresponds to the second digital identifier;

the first digital identifier is a function of the first computing system but is not a function of the requested digital information or the catalog file; and said electronically unwrapping is performed upon an attempt to access the requested digital information by a computing system on which the requested digital information and the catalog file resides, said electronically unwrapping comprising:

(a) making said determination as to whether the catalog file is validly located on the computing system attempting to access the requested digital information;

(b) checking the catalog file for the presence of a product activation code corresponding to the requested digital information; and (c) allowing access to the digital information only where the catalog file is validly located on the computing system attempting to access the requested digital information and the product activation code is present in the catalog file, wherein the product activation code is a function of the requested digital information but is not a function of the first computing system.

2. A computer-readable medium having computer-executable instructions for the method recited in claim 1.

3. A computer data signal embodied in a carrier wave readable by a computing system and encoding a computer program of instructions for executing a computer process performing the method recited in claim 1.

4. An apparatus for transmitting one or more data packages and controlling access to the one or more data packages, the apparatus including:

a first computer system including a first processor and a first data storage device coupled to the first processor; and a second computer system including a second processor and a second data storage device coupled to the first processor, the second computer system being coupleable to the first computer system to allow communication between the first and second computer systems;

wherein the first and second computer systems are configured to:
(a) receive a user selection of a data package stored on the second computer system;
(b) generate a request message corresponding to the user selection at the first computer system;
(c) transmit the request message from the first computer system to the second computer system;
(d) generate a response message at the second computer system, the response message including the user selected data package with associated digital instructions and a product activation code;
(e) transmit the response message from the second computer system to the first computer system;
(f) upon receipt of the response message, store the user selected data package with associated digital instructions and the product activation code in the first storage device;
(g) upon an attempt to access the user selected data package, execute the associated digital instructions to check for the presence of the product activation code and allowing access to the user selected data package only if the product activation code is present wherein the first and second computer systems are further configured to:
store a catalog file on the first storage device;
store the product activation code within the catalog file;
generate a first digital identifier and store the first digital identifier within the catalog file;
upon an attempt to access the user selected data package, generate a second digital identifier, determine whether the catalog file is validly located on the first computer system comprising comparing the first digital identifier to the second digital identifier, and allow access to the user selected data package only if the first and second digital identifiers correspond and the product activation code is present.

5. The apparatus of claim 4, wherein the first computer system generates a first and second digital identifiers based on characteristics of the first computer system, and the first and second digital identifiers are a function of the first computer system but are not a function of the catalog file or the user selected data package.

6. The apparatus of claim 5, wherein the product activation code is a function of the user selected data package but is not a function of the first computer system.

* * * * *